US008005210B2

(12) United States Patent  
Ozturk et al.

(10) Patent No.: US 8,005,210 B2
(45) Date of Patent: Aug. 23, 2011

(54) MODULUS SCALING FOR ELLIPTIC-CURVE CRYPTOGRAPHY

(75) Inventors: Erdinc Ozturk, Worcester, MA (US); Vinodh Gopal, Westboro, MA (US); Gilbert Wolrich, Framingham, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 1028 days.

(21) Appl. No.: 11/772,165

(22) Filed: Jun. 30, 2007

(65) Prior Publication Data

US 2009/0003594 A1 Jan. 1, 2009

(51) Int. Cl.
*H04K 1/00* (2006.01)
*H04L 9/00* (2006.01)
*H04L 9/28* (2006.01)
*G06F 7/72* (2006.01)

(52) U.S. Cl. .............. 380/30; 380/28; 380/46; 708/490; 708/491; 708/492; 708/518; 708/523; 708/525

(58) Field of Classification Search .............. 380/30
See application file for complete search history.

(56) References Cited

U.S. PATENT DOCUMENTS

| 4,658,094 | A | * | 4/1987 | Clark | 380/28 |
| 5,373,560 | A | * | 12/1994 | Schlafly | 380/30 |
| 5,982,900 | A | * | 11/1999 | Ebihara et al. | 380/30 |
| 7,080,109 | B2 | * | 7/2006 | Koc et al. | 708/491 |
| 7,590,235 | B2 | * | 9/2009 | Hubert | 380/30 |
| 7,647,367 | B2 | * | 1/2010 | Fischer et al. | 708/491 |
| 7,702,105 | B1 | * | 4/2010 | Gura et al. | 380/255 |
| 2002/0126838 | A1 | * | 9/2002 | Shimbo et al. | 380/28 |
| 2003/0031316 | A1 | * | 2/2003 | Langston et al. | 380/28 |
| 2003/0081771 | A1 | * | 5/2003 | Futa et al. | 380/30 |
| 2005/0105723 | A1 | * | 5/2005 | Dupaquis et al. | 380/59 |
| 2007/0168411 | A1 | * | 7/2007 | Hubert | 708/492 |
| 2010/0061547 | A1 | * | 3/2010 | Langendorfer et al. | 380/28 |

OTHER PUBLICATIONS

Guajardo, J., et al, 'Efficient Hardware Implementation of Finite Fields with Applications to Cryptography', Sep. 26, 2006, © Springer Science, entire document, http://www.crypto.rub.de/imperia/md/content/texte/publications/journals/efficient_hard_finitef.pdf.*
A. Menezes, "Efficient Implementation", Handbook of Applied Cryptography, Chapter 14, 1997, pp. 591-634.
M. Brown et al., "Software Implementation of the NIST Elliptic Curves Over Prime Fields", Lecture Notes in Computer Science; vol. 2020, Proceedings of the 2001 Conference on Topics in Cryptology: The Cryptographer's Track at RSA, Springer Verlang, 2001, pp. 250-265.
Certicom Corp., Standards for Efficient Cryptography, "SEC 1: Elliptic Curve Cryptography", Version 1.0, Sep. 20, 2000, 96 pages.

* cited by examiner

*Primary Examiner* — Christian LaForgia
*Assistant Examiner* — Ronald Baum
(74) *Attorney, Agent, or Firm* — Caroline M. Fleming

(57) ABSTRACT

Modulus scaling applied a reduction techniques decreases time to perform modular arithmetic operations by avoiding shifting and multiplication operations. Modulus scaling may be applied to both integer and binary fields and the scaling multiplier factor is chosen based on a selected reduction technique for the modular arithmetic operation.

17 Claims, 5 Drawing Sheets

MODULUS SCALING FOR ELLIPTIC-CURVE CRYPTOGRAPHY

FIELD

This disclosure relates to public key cryptography and in particular to Elliptic-Curve Cryptography (ECC).

BACKGROUND

Public key cryptography is typically used for secure communications over the Internet, for example, to distribute secret keys used in cryptographic algorithms. Public key cryptography is also used in digital signatures to authenticate the origin of data and protect the integrity of that data. Commonly used public key algorithms include Rivert, Shamir, Aldeman (RSA) and Diffie-Hellman key exchange (DH). The public key algorithm may be used to authenticate keys for encryption algorithms such as the Data Encryption Standard (DES) and the Advanced Encryption Standard (AES).

RSA and DH provide security based on the use of number theory. RSA is based on factoring the product of two large prime numbers. DH is based on a discrete logarithm for finite groups. Typically, public key systems such as RSA and DH use 1024-bit parameters.

The Elliptic Curve Cryptosystem (ECC) is a relatively new public key algorithm that is based on the arithmetic of elliptic curves. ECC provides the same level of security as RSA and DH but uses parameters having fewer bits than parameters used by RSA or DH. For example, 1024-bit parameters are recommended for the RSA and DH public key algorithms and 160-bit parameters are recommended for the ECC algorithm to authenticate an 80-bit key. 3072-bit parameters are recommended for the RSA and DS public key algorithms and 224-bit parameters are recommended for the ECC algorithm to protect a 128-bit key.

Elliptic curve cryptography (ECC) provides more security than traditional cryptosystems based on integer fields for much smaller key-sizes. It is very efficient from the perspectives of computes, power, storage and bandwidth to transmit keys. It scales much better than the traditional schemes and is therefore likely to gain more popularity with increased need for higher security strengths. Elliptic curves are algebraic/geometric objects that have been extensively studied by mathematicians. These curves can be applied to cryptography by suitably defining the underlying field and constraining the parameters such that the points on the curve form a Group (suggested in 1985 independently by Neil Koblitz and Victor Miller).

Elliptic curves for cryptographic applications are defined over prime fields (Galois Field Prime (GFP)) and binary fields (Galois Field Binary (GF2m)) GFP and GF2m both have a finite number of points that form a mathematical Group structure. The points can be operated on by special "addition" or "subtraction" operations. For any two points P1 and P2 in the group: P3=P1+P2 is defined. After point-addition has been defined, the basic building blocks of any cryptosystem are computations of the form Q=[k]P. The operation [k]P may be referred to as scalar point multiplication. This can be defined as P added to itself (k−1) times. Note that 1<=k<ord(P), where "ord" is defined as the order of the element of the group. Given P and [k]P, it is computationally infeasible to recover k.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
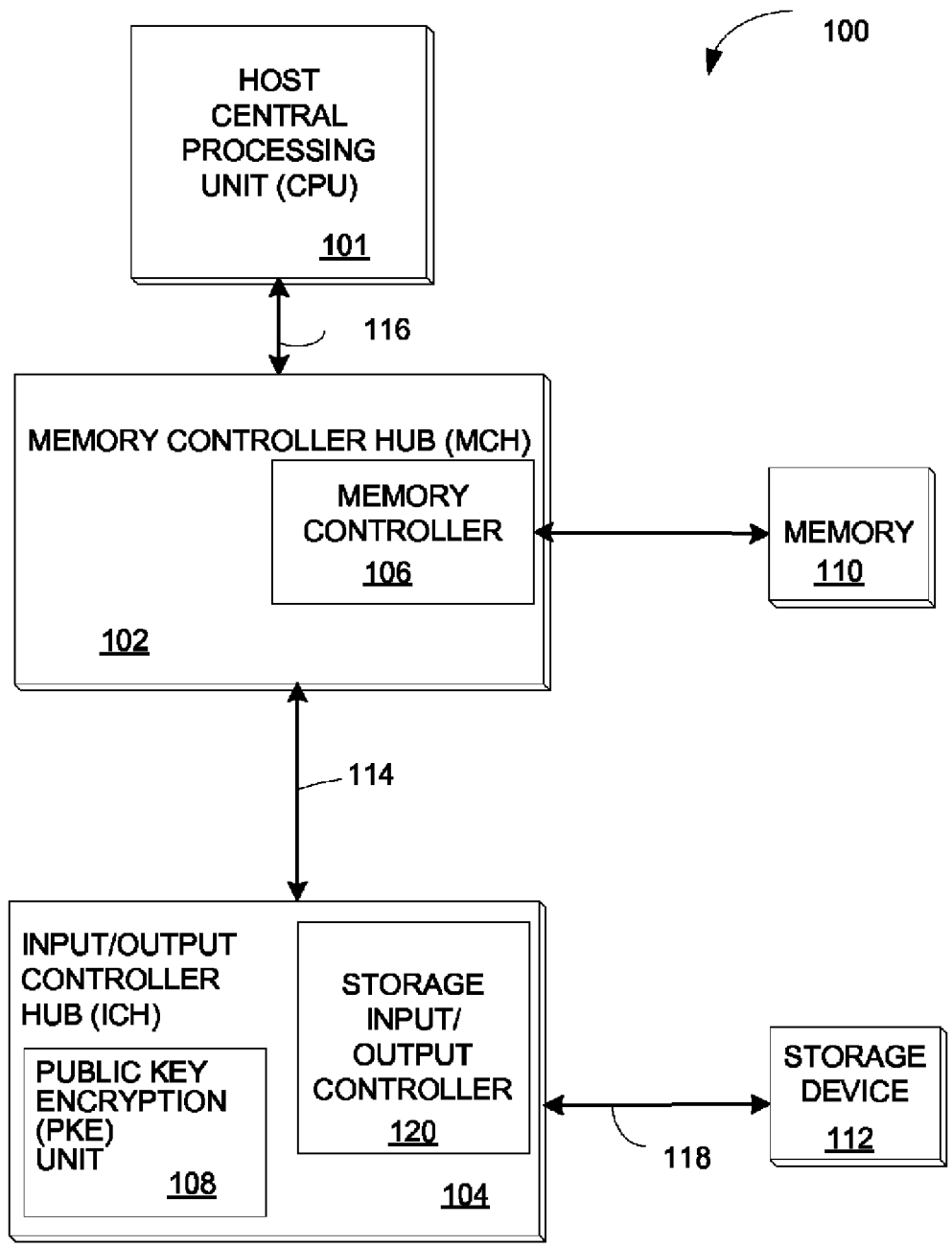
FIG. 1 is a block diagram of a system that includes an embodiment of a Public Key Encryption (PKE) unit to perform computations for ECC.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Federal Information Processing Standard (FIPS) 186-3 describes standard National Institute of Standards and Technology (NIST) elliptic curves. For example, there are standard NIST ECC curves for prime field sizes of 192, 224, 256, 384 and 521 bits and for binary field sizes of 163, 233, 283, 409 and 571 bits.

Modular arithmetic such as modular multiplication (that is, $r = x \cdot y \mod m$) is typically used to perform computations for ECC. Many of the standard NIST field sizes are not a multiple of 8-bits, for example, the NIST P-521 curve is not a multiple of 8-bits. Thus, in a system having a data path that is a multiple of 8-bits modular, multiple shift operations are required to align operands (x, y) and the result of modular multiplication to the data path size.

For example, in a system having a 64-bit data path, the alignment of operands requires a significant amount of shifting, which uses a significant number of compute cycles. If the operands are scaled to align the operands to the 64-bit data path, the number of shift operations is reduced but the number of shift operations is still a significant percentage of the compute cycles.

For example, if operands A and B are both 300 bits, the product of A×B is 600 bits. In a system with a 64-bit data path, the 600 bit product is not aligned to a 64-bit word. This involves 24 (600−576) single-bit shift vectors in order to align to a 64-bit word which increases the number of compute cycles to perform modular multiplication.

An ECC computation involves arithmetic operations on an elliptic curve over a finite field. A finite field consists of a finite set of elements. Addition and multiplication operations may be performed on pairs of field elements. There is one finite field containing q elements if and only if q is a power of a prime number. A prime finite field is a field with q=p, where p is an odd prime.

The elements of the prime finite field may be represented by the set of integers $\{0, 1, \ldots, p-1\}$ with addition defined as $a+b=r \mod p$. The "mod p" refers to addition modulo p where r is the remainder when the integer a+b is divided by p. Multiplication is defined as $a \cdot b = s \mod p$. Barrett Reduction is an algorithm (technique) that computes $r = x \mod m$. However, when performing a Barrett reduction in a 64-bit data path with non-binary field sizes, alignments of various subvectors require a significant amount of shifting to align the operands and the result, which is expensive for both run-time and for storing the code required for performing the shifting operations.

In an embodiment of the present invention, the number of shifting and multiply operations required for ECC field sizes that are not a multiple of the data path word size are reduced. This results in a significant increase in performance and reduction in program code complexity. An embodiment of the invention may be used for both prime (integer) fields and binary fields and for reduction algorithms such as Barrett reduction or Montgomery Reduction. In another embodiment, the number of shifting and multiply operations may be reduced for modular exponentiation and modular reductions in general such as required in RSA/DSA protocols.

Shifting operations are avoided in ECC applications by applying modulus scaling to reduction techniques such as Barrett reduction and Montgomery reduction which are used in modular exponentiation to perform an exponentiation of two numbers modulo a large number, for example, $$x = g^e \bmod m$$

Where g, e and m are k-bit integers
The technique may be applied to both integer and binary fields. The scaling multiplier value is selected based on the selected reduction technique. An embodiment for modular exponentiation will be described.

An exponentiation of $x = g^e \bmod m$ may be computed using a scaled modulus M as follows:

$$y = g^e \bmod M$$

$$x = Y \bmod m.$$

If e is 384 bits long, then are 1.5*384=576 reductions using the scaled modulus. After all reductions have been performed using the scaled modulus M, only one reduction is performed using modulus m to provide x. Thus, performing reductions with respect to a scaled modulus M instead of modulus m, decreases the number of compute cycles by reducing the number of shift operations to align with the data path size.

FIG. 1 is a block diagram of a system 100 that includes an embodiment of Public Key Encryption (PKE) unit 108 to perform computations for ECC. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 110. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 110 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 120 for controlling communication with at least one storage device 112 coupled to the ICH 104. The storage device 112 may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

Figure 2:
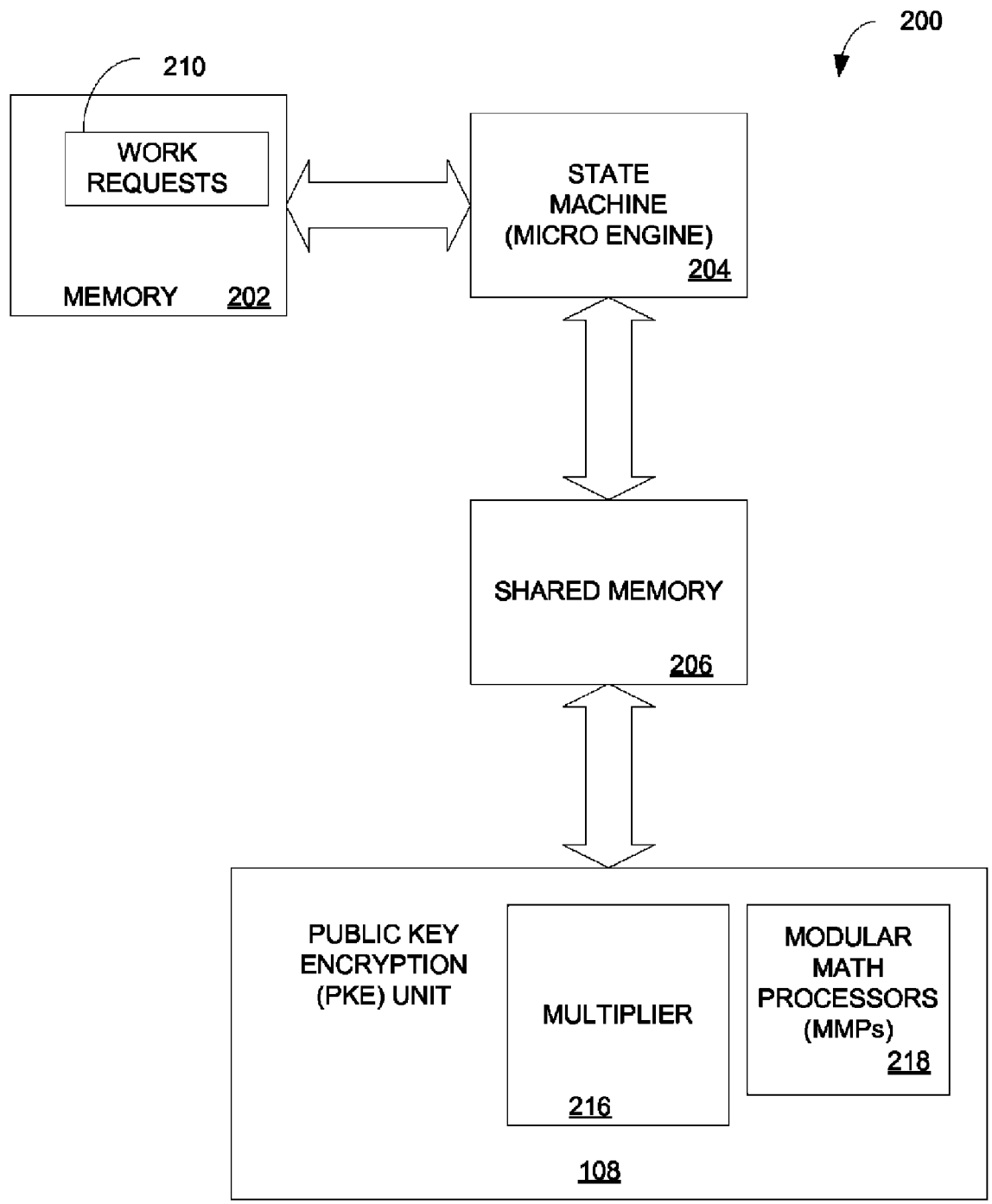
FIG. 2 is a block diagram of a system that includes an embodiment of a system that includes a public key encryption (PKE) unit.

FIG. 2 is a block diagram of a system that includes an embodiment of a system 200 that includes a public key encryption (PKE) unit 108.

The system includes a memory 202 for storing work requests 210 and a state machine (micro engine) 204 which processes the work requests 210. The state machine 204 issues instructions to the PKE unit 208 through a shared memory 206.

In one embodiment the state machine 204 may be one of a plurality of micro engines in a processor, for example, a micro engine in an IXP® 2400 processor available from Intel Corporation. The PKE unit 108 offloads computationally expensive operations from the state machine (micro engine) 204.

The memory 202 and the shared memory 206 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

Based on a work request 210 stored in memory, the state machine 204 may offload computationally expensive operations in Diffie-Hellman key exchange, Digital Signature Algorithm (DSA) digital signature, Rivest, Shamir, Adleman (RSA) encryption/decryption and primality testing to the PKE unit 208.

The PKE unit 108 includes one or more modular math processors (MMP) 218 and a multiplier 216. The PKE unit 208 may perform modular arithmetic on large numbers. An example of a modular arithmetic is a modular exponential operation such as, $g^e \bmod m$ where g is the base, e is the exponent and m is the modulus.

Figure 3:
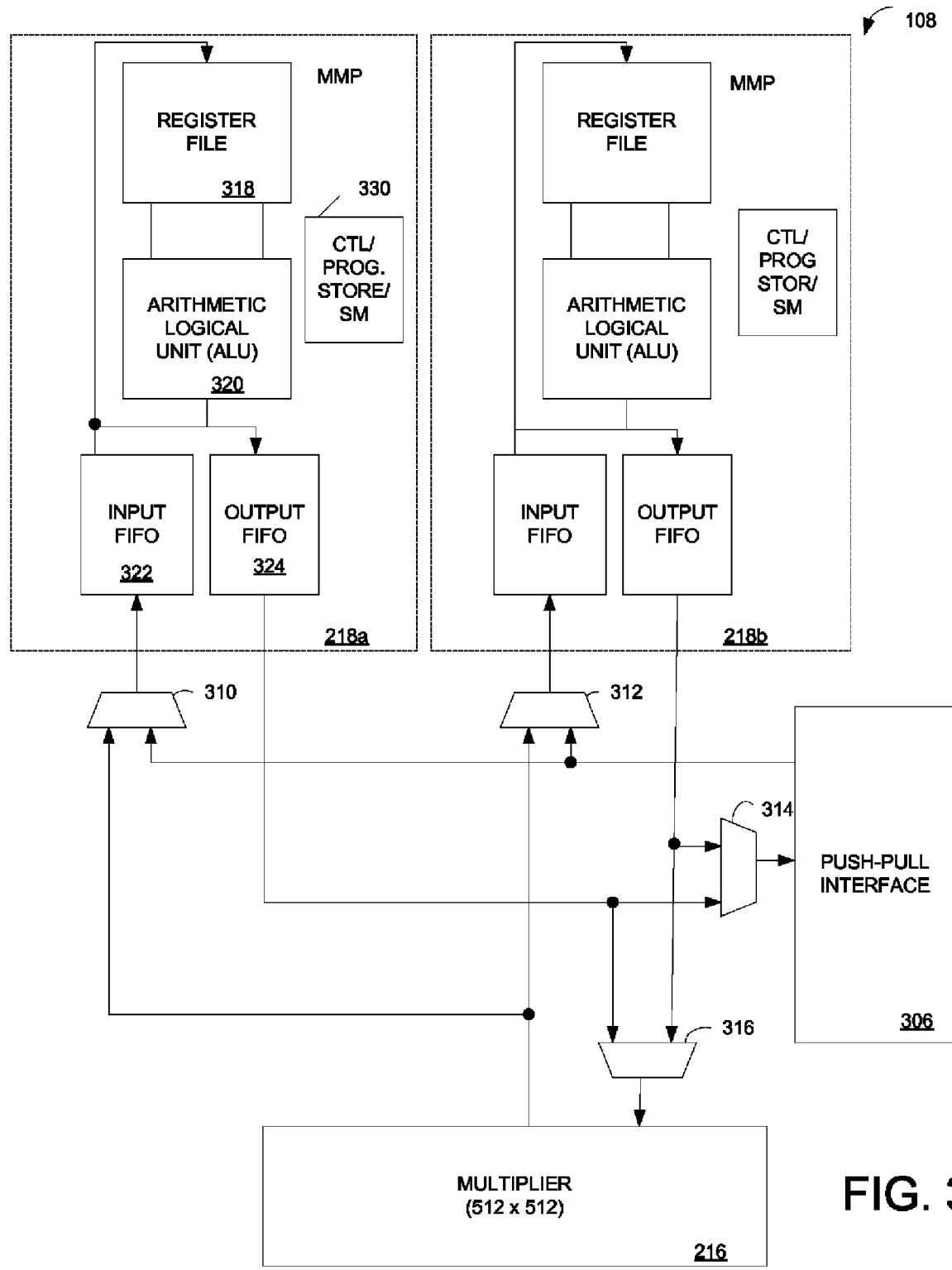
FIG. 3 is a block diagram of an embodiment of the PKE unit shown in FIG. 2.

FIG. 3 is a block diagram of an embodiment of the PKE unit 108 shown in FIG. 2. In the embodiment shown, the PKE unit 108 includes two modular math processors (MMPs) 218a, 218b. However, the PKE unit 108 is not limited to two MMPs 218a, 218b, in other embodiments, the PKE unit 108 may have more than two MMPS.

The PKE unit 108 performs computationally expensive mathematical computations such as modular exponentiation, division and greatest common divisor (gcd). The PKE unit 108 also includes a multiplier 216, which is shared by the MMPs 218a, 218b. In the embodiment shown, the multiplier 216 is a 512×512 multiplier.

Each MMP 218a, 218b includes a respective input First In First Out (FIFO) 322 and an output FIFO 324. The communication path through each MMP 218a, 218b is through the FIFOs 322, 324 by enqueuing data to the input FIFO 322 and dequeuing data from the output FIFO 324. The states of the MMPs 218a, 218b are independent from each other and each MMP 218a, 218b may be concurrently transferring data to/from shared memory 206 (FIG. 2) through the push-pull interface 306.

The multiplier 216 may be accessed via an internal PKE bus by the MMPs 216 and an arbitration mechanism that includes multiplexers 310, 312, 314 and 316 and associated multiplexer control logic (not shown). As the multiplier 216 is shared by the MMPs 218a, 218b, the multiplexer logic controls which MMP 218a, 218b is currently using the multiplier 308.

Through control logic/program store/sate machine 330, the operand size for each MMP 218a, 218b is configurable. In one embodiment the operand size may be configured to be 256 or 512 bits. The type of multiply operation is also configurable. In one embodiment, the type of multiply operation performed by the multiplier 216 for a particular MMP 218a, 218b may be unsigned integer or Galois Field (carry-less). Based on the configured operand size and multiply operation for a particular MMP 218a, 218b, the MPP 218a, 218b operates on the required length result vectors without explicit command encodings.

Various programs may be loaded into each of the MMP control stores 300. For example, a program for prime-fields that performs scalar point multiplication that works efficiently for all prime ECC sizes<521 bits may be loaded into the control store 330 of one of the MMPs 218a, 218b.

The single shared multiplier 216 may work in one mode with MMP 218a and another mode with MMP 28b in an interleaved fashion. For example, MMP 218a may perform a binary ECC operation on 233 bit fields, thus requiring the multiplier to be set in 256 bits, Galois Field ({256b, GF*}) mode. MMP 218b may be operating on 384-bit prime ECC field, requiring the multiplier to be set in 512 bit, integer ({512b, int*}) mode; these operations are supported concurrently. Furthermore, each MMP may be configured to perform one of a plurality of reduction methods, for example, Barrett Reduction or Montgomery Reduction.

According to an embodiment of the present invention, a generic modulus scaling technique is provided for all reduction algorithms that do not require prime values.

Figure 4:
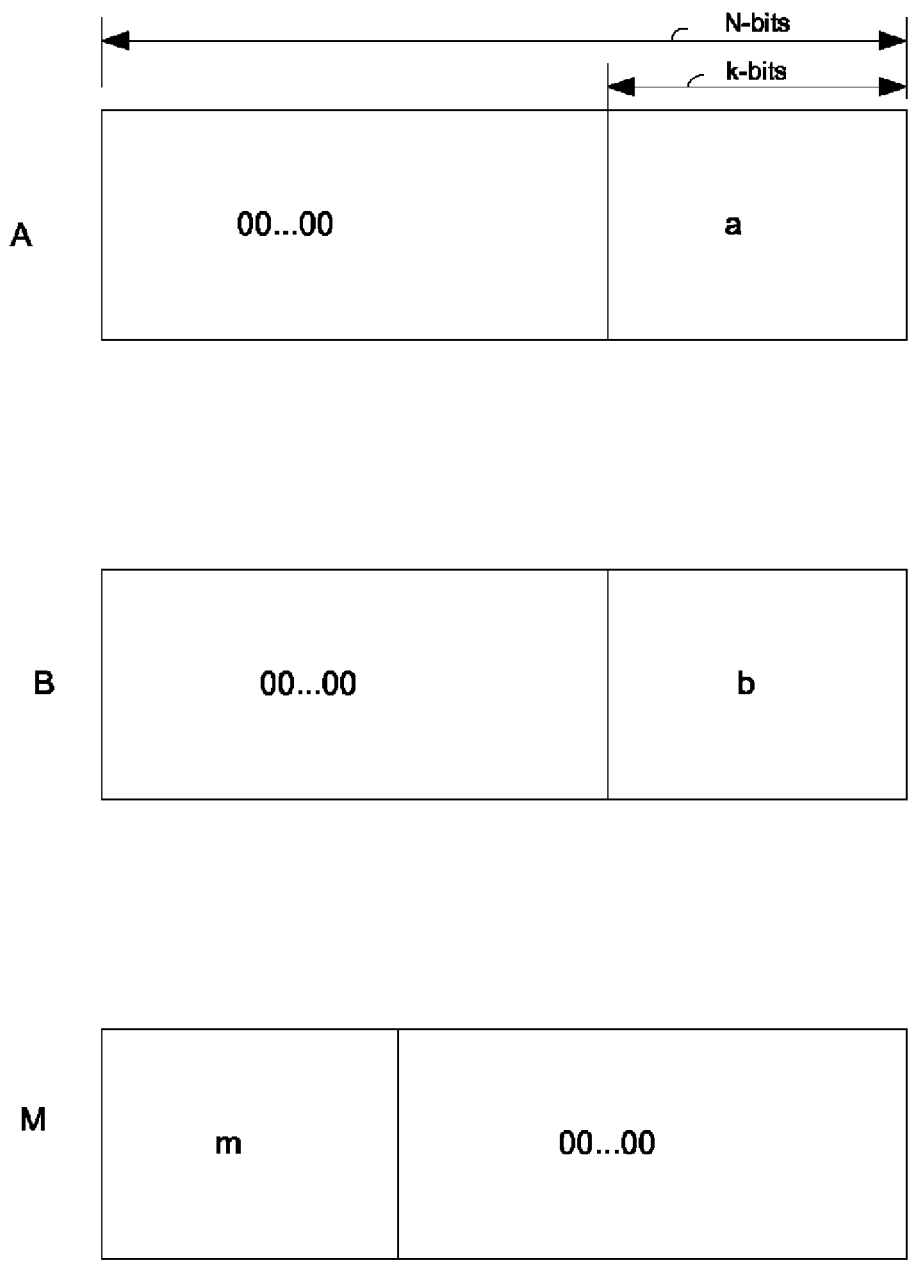
FIG. 4 is a block diagram illustrating a modulus (m) and operands (a, b) for use in a modular arithmetic operation.

FIG. 4 is a block diagram illustrating a modulus (m) and operands (a, b) for use in a modular arithmetic operation. The modulus (m) and operands (a, b) each have k-bits. Modulus scaling is provided by scaling the value of m to N-bits where N is greater than k and is selected to be a multiple of the data path size and is also dependent on the multiplier size, for example, 512 for a 512-bit multiplier. The operands are not scaled, but are treated as N-bit operands instead of k-bit operands.

Modulus scaling is performed instead of operand scaling because as ECC computations involve many operands, operand scaling would have to scale many numbers, whereas modulus scaling applies to one number. Furthermore, shifting operations during the main computations may be avoided and only one slower final transformation to the non-scaled original modulus may be performed.

The bit length of operand values a, b and modulus m is k-bits, k may be one of the NIST-recommended field sizes, for example, 192-bits, 224-bits, 256-bits, 384-bits or 521-bits. In one embodiment with a data path size of 64-bits, N is selected to be 512 or 256, that is, a multiple of the data path size (64-bits).

The operands (a, b) are treated N-bits by adding 0s to the Most Significant bits (MSB)>k+1 bits of the operands (a, b) to provide N-bit operands (A, B). The modulus (m) is scaled to N-bits by shifting the modulus (m) to the left by N−k bits and clearing the N−k Least Significant bits (LSB) of the N-bit scaled modulus M to '0'. In an embodiment in which N is 512-bits, the modulus m is scaled to 512-bits. In another embodiment in which N is 256-bits, the modulus is scaled to 256-bits.

During intermediate stages of computation, the numbers are partially reduced with respect to the scaled modulus. At the very end of the computation, the N-bit result is converted back to k-bits.

Figure 5:
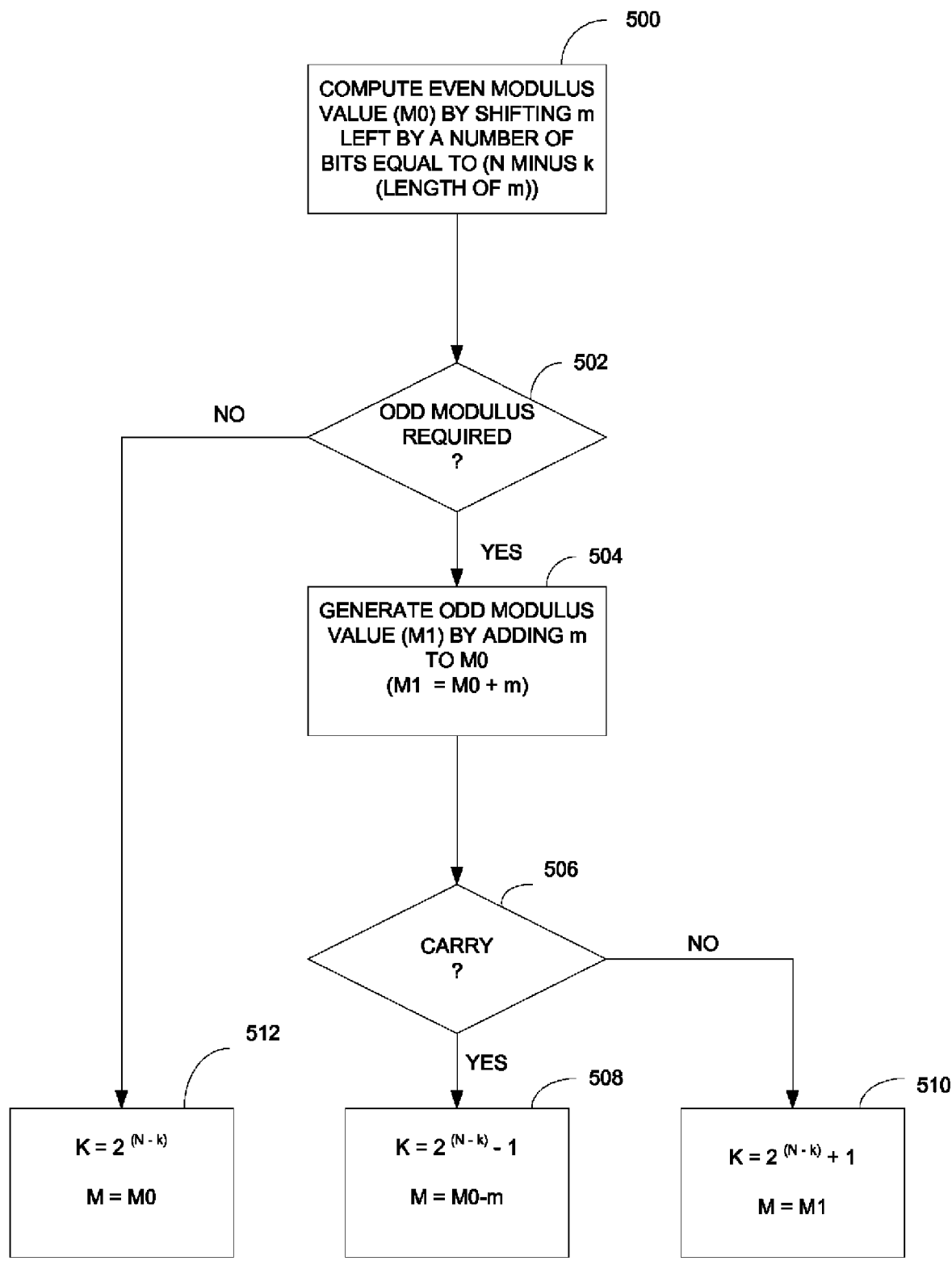
FIG. 5 is a flow graph illustrating an embodiment of a method for applying modulus scaling and for choosing the scaling multiplier value K according to an embodiment of the present invention.

FIG. 5 is a flow graph illustrating an embodiment of a method for applying modulus scaling and for choosing a scaling multiplier value K according to an embodiment of the present invention.

Modulus scaling is used to scale a modulus (m) having k-bits so that it is aligned with the data path size. The scaled modulus M has N-bits. In one embodiment, the data path size is 64-bit and N is 512-bits or 256-bits. A value K is selected such that:

$$M = K*m;$$

where M is the value of the scaled modulus (a value that has exactly N-bits) and m is a k-bit value where the number of bits (k) and the value of m are specified for one of a plurality of ECC curves that are defined by NIST.

There are a plurality of known reduction algorithms that are typically used for providing the result of an ECC point operation, for example, Barrett Reduction and Montgomery Reduction. These reduction techniques differ in requirements for the value of the modulus m. For example, Montgomery Reduction requires that the value of the modulus m be odd. However, Barrett Reduction does not place any restriction on whether the value of the modulus m is odd or even. Thus, modulus scaling according to an embodiment of the present invention generates a scaled modulus M dependent on the selected reduction type.

The modulus m is a number that is less than N bits in length. To optimize shifting operations, intermediate reductions can be performed modulo a scaled modulus M that is exactly N bits in length. In an embodiment N is 512 bits.

A scaled modulus value M is computed based on a selection of a value K (a positive integer) such that:

$$M = m*K.$$

Knowing that $R < m;$ $$R = T \bmod m,$$

where T=A mod M.

Thus, intermediate computations (T) are computed using the scaled modulus M and the final result (R) is computed using the modulus m.

This can be shown as follows:

$T = A \bmod M$, thus $$A = q*M + T \quad (1)$$

After substituting M=K*m in (1)

$$A = q*K*m + T \quad (2)$$

After substituting T=$q_t$*m+R in (2)

$$A = q*K*m + q_t*m + R \quad (3)$$

With common factor m $$A = m*(q*K + q_t) + R \quad (4)$$

Thus, based on R=A mod m from (4), which is the desired result $$R = T \bmod m$$

Modulus scaling requires the aligning of modulus m to N-bits (that is, the number of bits in scaled modulus M). The alignment is performed by shifting modulus m to the left by a number of bits equal to the difference between the number of bits in scaled modulus M (that is, N-bits) and the number of bits in modulus m (that is, k-bits).

The value of modulus m is always odd based on values of m that are defined by NIST for a particular ECC curve. However, when performing modulus scaling to convert the value of modulus m to a value of scaled modulus M by performing bit shift operations, the resulting value of scaled modulus M is even, that is, bit 0 is '0'.

After the shift operation is complete, the k-bits of modulus m are stored in the Most Significant Bits of the N-bits of scaled modulus M. Thus, m has been aligned to exactly N-bits. However, as a result of the shift operation, the least significant bits of scaled modulus M are '0' and the value of the scaled modulus M is even. This scaled modulus value M may be used for Barrett Reduction because Barrett does not place any restrictions on whether the value of the modulus is even or odd. However, the scaled value of the modulus, that is, M cannot be used for Montgomery Reduction because Montgomery reduction requires a modulus that has an odd value.

FIG. 5 is a flow graph illustrating a method for generating an aligned scaled modulus according to the principles of the present invention. The method will be described for a scaled modulus M having exactly 512-bits, that is, N is 512.

At block 500, the k-bits of the modulus m are shifted to the left by 512-k bits to align the modulus m value as shown in FIG. 4. The 512-k Least Significant bits (LSB) are set to 0 resulting in an even value of the scaled modulus M having a length of 512-bits. Processing continues with block 502.

At block 502, the type of reduction algorithm selected to be performed is checked to determine if the selected type of reduction algorithm requires an odd modulus. For example, an indication of the type of reduction algorithm to be used may be included in an instruction issued to the MMP 218a, 218b (FIG. 3) and may be stored in the control logic/program store/state machine 330 (FIG. 3). If the selected type of reduction algorithm requires an odd value of the modulus, for example, the reduction algorithm is Montgomery Reduction, processing continues with block 504. If not, processing continues with block 512.

At block 504, the value of M is known to be even and the value of m is known to be odd. Adding or subtracting an odd number to/from an even number results in an odd number. However, although the value of m is known to be odd, the actual value of m is unknown. Thus, it is not known whether adding m to M may result in a carry which would extend the size of M beyond 512 bits. The value of modulus m is added to the scaled modulus M0 to provide an odd value of scaled modulus M0. Processing continues with block 506.

At block 506, as the value of K can be selected to be any number of m such that M=K×m, the number K is initially increased by m to provide an odd number. If this odd number is greater than the number of bits in M, the number K is reduced by 2*m to provide a value that is odd and is less than 512 bits. The value of the scaled modulus M0 is checked to determine if it exceeds 512-bits, that is, if the carry bit at bit 513 is set or clear. If the value of the scaled modulus M1 does not exceed 512-bits, that is, the carry bit is clear, processing continues with block 510. If the result of adding modulus m to the scaled modulus M0 results in the carry bit being set, processing continues with block 508.

At block 508, the value of the scaled modulus M1 is greater than 512-bits; the value of modulus m is subtracted from the scaled modulus M0 to provide an odd value of the scaled modulus M that has 512-bits for use as the scaled modulus for Montgomery Reduction. As the result of the add operation resulted in a carry to bit 513, subtract operations are performed to subtract m twice from M1 or to subtract m once from M0, if M0 is available. As the result has already added one m, two subtract operations are required, one to subtract the m that was initially added and another to subtract m from the original value of M, that is, M0. Thus, the value of M is now odd and does not exceed 512-bits.

K is selected as $K=(2^{(512-t)}-1)$. This is guaranteed to make the scaled modulus M odd and exactly 512 bits long and can be achieved without multiplication. This assumes that the modulus m is odd, t>1 and t<512. Processing is complete.

At block 510, the odd value scaled modulus M1 is selected as the scaled modulus M for Montgomery Reduction. K is selected as $K=(2^{(512-t)}+1)$. This is guaranteed to make the scaled modulus M odd and exactly 512 bits long and can be achieved without multiplication. This assumes that the original modulus m is odd, t>1 and t<512. Processing is complete.

At block 512, the even value scaled modulus (M1) is used as the scaled modulus (M) for Barrett Reduction. The value of K can be chosen to make m exactly 512 bits in length. If modulus m is k bits long, then K can be chosen as $2^{(512-k)}$ for Barrett reduction. Processing is complete.

The fields may be integer or binary. For binary fields, there is no carry overflow/underflow, thus, block 510 is never reached.

In the embodiment shown, an add operation to add m is performed first with a check for 513-bits, that is, a carry bit. In another embodiment a subtract operation to subtract m may be performed first. However, as the result may only be 511-bits, this condition must be checked because the scaled modulus M must be exactly 512-bits. Checking for a 511 bit condition involves checking the state of bit 512 which is more complicated than the 513-bit case which results in the carry bit being set. If the scaled modulus is 511-bits, further operations may be required to scale the modulus to 512-bits.

In other embodiments, the modulus scaling technique may be used for exponentiation or for modular reduction required for DSA where the operand sizes are not multiples of 512 bits.

After the modulus and operands have been scaled, modular arithmetic computations may be performed using the values of the scaled modulus (M) and the operands (A, B). During intermediate stages of the computation, the numbers are partially reduced with respect to the scaled modulus (M). At the end of the scalar point multiplication operation, the N-bit result is reduced back to k-bits. By scaling the modulus to a number of bits that is a multiple of the 64-bit data path, the number of shifting operations required to align the operands and to extract the result are reduced.

For example, the result of point multiplication (C) of operand A by operand B may be written as follows:

$$C = A \times B \bmod m$$

where the result C is the remainder upon dividing the product of A×B by m

After expanding the operands and result to mod M, the result (R) may be written as follows:

$$R = A \times B \bmod M,$$

where M>m and $M=m2^P$; where P is the number of zeros added to shift (multiply by 2)

The result R is the remainder upon dividing the product of A×B by M.

Having computed R, the result C may be derived from the Result (R) computed using mod M as follows:

$$C = R \bmod m$$

The result C is the remainder upon dividing the result R by m.

Thus, the scalar operations are performed with modulus M reducing the number of shift operations and the final result is scaled back to modulus m.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising: an encryption unit to generate an N-bit scaled modulus for a received k-bit generated modulus having an odd value based on a selected one of a plurality of reduction techniques and to perform the selected one of the reduction techniques using the N-bit scaled modulus number, k one of 192, 224, 256, 384 and 521 for an integer field, or k one of 163, 233, 283, 409 and 571 for a binary field, N greater than k, the Most Significant k-bits of the N-bit scaled modulus to store the k-bits of the generated modulus and the N−k Least Significant Bits of the N-bit scaled modulus set to 0; and a memory to store a result of the performing of the selected one of the reduction techniques.

2. The apparatus of claim 1, wherein the N-bit scaled modulus is an odd value.

3. The apparatus of claim 1, wherein the N-bit scaled modulus is 64-bit aligned.

4. The apparatus of claim 1, wherein the N-bit scaled modulus is an even value.

5. The apparatus of claim 1, wherein the reduction technique is Barrett Reduction.

6. The apparatus of claim 1, wherein the reduction technique is Montgomery Reduction.

7. A method comprising: generating, by an encryption unit, an N-bit scaled modulus for a received k-bit generated modulus having an odd value based on a selected one of a plurality of reduction techniques, k one of 192, 224, 256, 384 and 521 for an integer field, or k one of 163, 233, 283, 409 and 571 for a binary field, N greater than k, the Most Significant k-bits of the N-bit scaled modulus to store the k-bits of the generated modulus and the N−k Least Significant Bits of the N-bit scaled modulus set to 0;

performing, by the encryption unit, the selected one of the reduction techniques using the N-bit scaled modulus number; and storing, by a processor, in a memory, a result of the performing of the selected one of the reduction techniques.

8. The method of claim 7, wherein the N-bit scaled modulus is an odd value.

9. The method of claim 7, wherein the N-bit scaled modulus is 64-bit aligned.

10. The method of claim 7, wherein the N-bit scaled modulus is an even value.

11. The method of claim 7, wherein the reduction technique is Barrett Reduction.

12. The method of claim 7, wherein the reduction technique is Montgomery Reduction.

13. A system comprising: a dynamic random access memory to store data and instructions; and a processor coupled to said memory to execute the instructions, the processor comprising: an encryption unit to generate an N-bit scaled modulus for a received k-bit generated modulus having an odd value based on a selected one of a plurality of reduction techniques and to perform the selected one of the reduction techniques using the N-bit scaled modulus number, k one of 192, 224, 256, 384 and 521 for an integer field, or k one of 163, 233, 283, 409 and 571 for a binary field, N greater than k, the Most Significant k-bits of the N-bit scaled modulus to store the k-bits of the generated modulus and the N−k Least Significant Bits of the N-bit scaled modulus set to 0; and to store a result of the performing of the selected one of the reduction techniques in the dynamic random access memory.

14. The system of claim 13, wherein the N-bit scaled modulus is 64-bit aligned.

15. The system of claim 13, wherein the reduction technique is Barrett Reduction.

16. The system of claim 13, wherein the reduction technique is Montgomery Reduction.

17. The system of claim 13, wherein the N-bit scaled modulus is an even value.

* * * * *